United States Patent
Davydov et al.

(10) Patent No.: US 10,003,367 B2
(45) Date of Patent: Jun. 19, 2018

(54) INFORMATION SIGNALLING FOR NETWORK ASSISTED INTERFERENCE MITIGATION

(71) Applicant: Intel Corporation, Santa Clara, CA (US)

(72) Inventors: Alexei Davydov, Nizhny Novgorod (RU); Seunghee Han, Cupertino, CA (US); Gregory Morozov, Nizhny Novgorod (RU); Alexander Maltsev, Nizhny Novgorod (RU); Ilya Bolotin, Nizhny Novgorod (RU)

(73) Assignee: INTEL CORPORATION, Santa Clara, CA (US)

( * ) Notice: Subject to any disclaimer, the term of this patent is extended or adjusted under 35 U.S.C. 154(b) by 0 days. days.

(21) Appl. No.: 14/440,337

(22) PCT Filed: Dec. 3, 2013

(86) PCT No.: PCT/US2013/072872
§ 371 (c)(1),
(2) Date: May 1, 2015

(87) PCT Pub. No.: WO2014/089079
PCT Pub. Date: Jun. 12, 2014

(65) Prior Publication Data
US 2015/0295695 A1   Oct. 15, 2015

Related U.S. Application Data

(60) Provisional application No. 61/732,851, filed on Dec. 3, 2012.

(51) Int. Cl.
*H04W 4/00* (2009.01)
*H04B 1/12* (2006.01)
(Continued)

(52) U.S. Cl.
CPC ............ *H04B 1/12* (2013.01); *H04B 1/3827* (2013.01); *H04B 7/0452* (2013.01);
(Continued)

(58) Field of Classification Search
CPC ....... H04B 1/12; H04B 1/3827; H04W 24/02; H04W 24/10; H04W 72/121;
(Continued)

(56) References Cited

U.S. PATENT DOCUMENTS 8,625,516 B2 *   1/2014   Lindoff .................. H04L 1/0045
                                                               370/329
8,995,592 B2 *   3/2015   Dao ....................... H04J 11/004
                                                               375/316
(Continued)

FOREIGN PATENT DOCUMENTS

WO   2010086715 A1   8/2010
WO   2012018611 A1   2/2012

OTHER PUBLICATIONS

International Search Report and Written Opinion dated Mar. 27, 2014 from International Application No. PCT/US2013/072872.
(Continued)

*Primary Examiner* — Kevin Mew
(74) *Attorney, Agent, or Firm* — Schwabe, Williamson & Wyatt, P.C.

(57) ABSTRACT

Methods and apparatuses for communicating in a wireless network include provision of interfering signal characteristics information to a user equipment to facilitate suppression of an interfering signal present in a downlink signal being received at the user equipment.

23 Claims, 4 Drawing Sheets

(51) Int. Cl.

| | | |
|---|---|---|
| H04W 72/12 | (2009.01) | |
| H04B 1/3827 | (2015.01) | |
| H04W 84/18 | (2009.01) | |
| H04W 92/18 | (2009.01) | |
| H04W 72/04 | (2009.01) | |
| H04L 25/03 | (2006.01) | |
| H04L 5/00 | (2006.01) | |
| H04W 36/10 | (2009.01) | |
| H04W 52/40 | (2009.01) | |
| H04W 76/04 | (2009.01) | |
| H04J 11/00 | (2006.01) | |
| H04W 72/08 | (2009.01) | |
| H04W 76/02 | (2009.01) | |
| H04W 52/02 | (2009.01) | |
| H04L 1/00 | (2006.01) | |
| H04W 24/02 | (2009.01) | |
| H04L 25/02 | (2006.01) | |
| H04B 7/0452 | (2017.01) | |
| H04B 7/06 | (2006.01) | |
| H04B 7/155 | (2006.01) | |
| H04L 1/18 | (2006.01) | |
| H04W 24/10 | (2009.01) | |
| H04B 17/24 | (2015.01) | |
| H04B 17/26 | (2015.01) | |
| H04B 17/345 | (2015.01) | |
| H04W 84/04 | (2009.01) | |
| H04L 27/00 | (2006.01) | |

(52) U.S. Cl.
CPC ....... *H04B 7/0617* (2013.01); *H04B 7/15557* (2013.01); *H04B 17/24* (2015.01); *H04B 17/26* (2015.01); *H04B 17/345* (2015.01); *H04J 11/005* (2013.01); *H04J 11/0053* (2013.01); *H04L 1/0003* (2013.01); *H04L 1/0054* (2013.01); *H04L 1/1854* (2013.01); *H04L 1/1867* (2013.01); *H04L 5/0007* (2013.01); *H04L 5/0048* (2013.01); *H04L 5/0053* (2013.01); *H04L 5/0055* (2013.01); *H04L 5/0057* (2013.01); *H04L 5/0058* (2013.01); *H04L 5/0092* (2013.01); *H04L 25/0202* (2013.01); *H04L 25/0206* (2013.01); *H04L 25/03305* (2013.01); *H04W 24/02* (2013.01); *H04W 24/10* (2013.01); *H04W 36/10* (2013.01); *H04W 52/0261* (2013.01); *H04W 52/40* (2013.01); *H04W 72/042* (2013.01); *H04W 72/0406* (2013.01); *H04W 72/048* (2013.01); *H04W 72/0486* (2013.01); *H04W 72/08* (2013.01); *H04W 72/082* (2013.01); *H04W 72/12* (2013.01); *H04W 72/121* (2013.01); *H04W 72/1242* (2013.01); *H04W 72/1247* (2013.01); *H04W 76/023* (2013.01); *H04W 76/046* (2013.01); *H04W 76/048* (2013.01); *H04W 84/18* (2013.01); *H04W 92/18* (2013.01); *H04L 27/0008* (2013.01); *H04W 72/1205* (2013.01); *H04W 84/042* (2013.01); *Y02B 60/50* (2013.01)

(58) Field of Classification Search
CPC ........ H04W 72/1242; H04W 72/1247; H04W 72/048; H04W 72/12; H04W 72/0406; H04W 72/08; H04W 72/0486; H04W 72/082; H04W 72/1205; H04W 84/18; H04W 84/042; H04W 92/19; H04W 36/10; H04W 52/40; H04W 52/0261; H04W 76/046; H04W 76/023; H04W 76/048; H04J 11/005; H04L 5/0007
See application file for complete search history.

(56) References Cited

U.S. PATENT DOCUMENTS

| | | | |
|---|---|---|---|
| 9,014,694 B2* | 4/2015 | Tiirola | H04J 11/004 455/432.1 |
| 9,276,724 B2* | 3/2016 | Tesanovic | H04L 5/0053 |
| 9,629,125 B2* | 4/2017 | Lu | H04W 72/0406 |
| 2011/0038310 A1 | 2/2011 | Chmiel et al. | |
| 2011/0092231 A1 | 4/2011 | Yoo et al. | |
| 2012/0008555 A1 | 1/2012 | Zhang et al. | |
| 2012/0087250 A1 | 4/2012 | Song et al. | |
| 2012/0201162 A1* | 8/2012 | Kim | H04B 17/345 370/252 |
| 2012/0213095 A1* | 8/2012 | Krishnamurthy | H04L 5/001 370/252 |
| 2012/0213096 A1* | 8/2012 | Krishnamurthy | H04L 5/001 370/252 |
| 2012/0236814 A1* | 9/2012 | Nishio | H04L 5/001 370/329 |
| 2012/0300715 A1* | 11/2012 | Pelletier | H04W 56/0005 370/329 |
| 2013/0021986 A1* | 1/2013 | Bhattad | H04W 28/18 370/329 |
| 2013/0044722 A1* | 2/2013 | Kang | H04L 1/1861 370/329 |
| 2013/0084910 A1* | 4/2013 | Suzuki | H04W 24/02 455/515 |
| 2013/0114437 A1* | 5/2013 | Yoo | H04J 11/005 370/252 |
| 2013/0148623 A1* | 6/2013 | Nishio | H04L 1/004 370/329 |
| 2013/0182799 A1* | 7/2013 | Geirhofer | H04W 56/00 375/340 |
| 2013/0196701 A1* | 8/2013 | Tiirola | H04J 11/0026 455/501 |
| 2013/0242890 A1* | 9/2013 | He | H04W 28/0268 370/329 |
| 2013/0272214 A1* | 10/2013 | Zhu | H04W 28/02 370/329 |
| 2013/0344877 A1* | 12/2013 | Ma | H04W 16/04 455/446 |
| 2014/0177602 A1* | 6/2014 | Chen | H04W 52/04 370/336 |
| 2014/0307569 A1* | 10/2014 | Barbieri | H04L 5/0032 370/252 |
| 2014/0348077 A1* | 11/2014 | Chen | H04W 72/12 370/329 |
| 2015/0016376 A1* | 1/2015 | Seo | H04W 72/0406 370/329 |
| 2015/0117362 A1* | 4/2015 | Luo | H04W 24/02 370/329 |
| 2016/0183220 A1* | 6/2016 | Rashid | H04W 72/042 370/329 |
| 2016/0183263 A1* | 6/2016 | Liu | H04W 24/02 370/329 |
| 2017/0156079 A1* | 6/2017 | Tsai | H04W 28/048 |

OTHER PUBLICATIONS

Samsung, "Discussions on cell detection issues for FeICIC," 3GPP TSG-RAN WG1#68bis meeting, R1-121620, Mar. 26-30, 2012, Jeju, Korea, 3 pages.

LG Electronics, "Considerations on CSI Derivation in FeICIC," 3GPP TSG RAN WG1 Meeting #68, R1-120429, Feb. 6-10, 2012, Dresden, Germany, 3 pages.

ETSI TS 136 211 V11.0.0 (Oct. 2012); Evolved Universal Terrestrial Radio Access (E-UTRA); Physical channels and modulation (3GPP TS 36.211 version 11.0.0 Release 11); 108 pages.

(56) References Cited

OTHER PUBLICATIONS

ETSI TS 136 212 V11.0.0 (Oct. 2012); Evolved Universal Terrestrial Radio Access (E-UTRA); Multiplexing and channel coding (3GPP TS 36.212 version 11.0.0 Release 11); 81 pages.
ETSI TS 136 213 V11.0.0 (Oct. 2012); Evolved Universal Terrestrial Radio Access (E-UTRA); Physical layer procedures (3GPP TS 36.213 version 11.0.0 Release 11); 145 pages.
European Patent Office; Extended European Search Report for Patent Application No. 13860099.4 dated May 30, 2016; 7 pages.

* cited by examiner

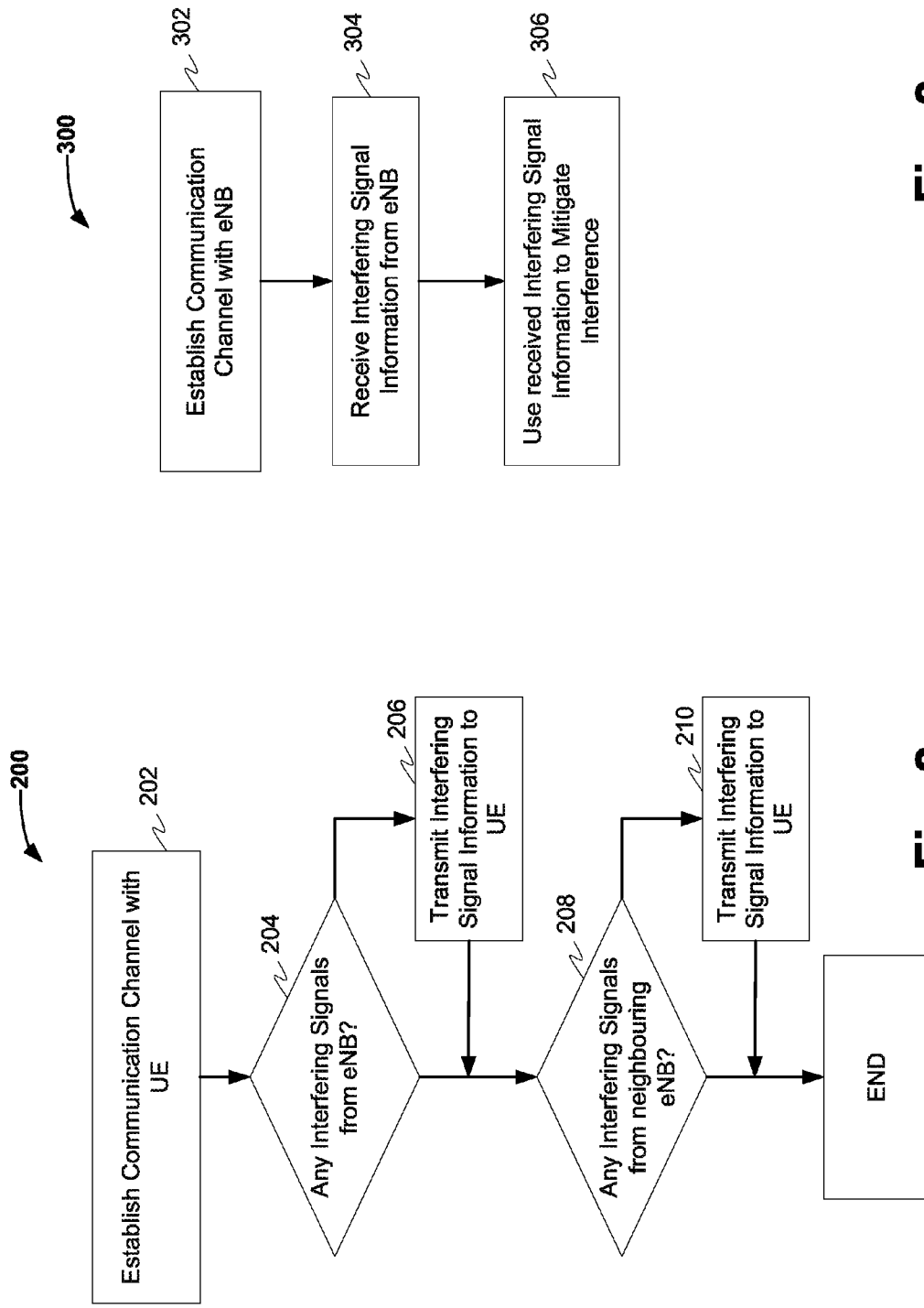

INFORMATION SIGNALLING FOR NETWORK ASSISTED INTERFERENCE MITIGATION

CROSS REFERENCE TO RELATED APPLICATIONS

The present application is a national phase entry under 35 U.S.C. § 371 of International Application No. PCT/US2013/072872, filed Dec. 3, 2013, entitled "INFORMATION SIGNALLING FOR NETWORK ASSISTED INTERFERENCE MITIGATION", which designates the United States of America, which claims priority to U.S. Patent Application No. 61/732,851, filed Dec. 3, 2012, entitled "ADVANCED WIRELESS COMMUNICATION SYSTEMS AND TECHNIQUES." The entire disclosures of which are hereby incorporated by reference in their entireties for all purposes, except for those sections, if any, that are inconsistent with this specification.

TECHNICAL FIELD

Embodiments described herein generally relate to the field of wireless communications and, more particularly, to the provision of information to facilitate interference mitigation in a wireless network.

BACKGROUND OF THE INVENTION

It is becoming more important to be able to provide telecommunication services to fixed and mobile subscribers as efficiently and inexpensively as possible. Further, the increased use of mobile applications has resulted in much focus on developing wireless systems capable of delivering large amounts of data at high speed.

Development of more efficient and higher bandwidth wireless networks has become increasingly important and addressing issues of how to maximize efficiencies in such networks is ongoing. Many techniques for maximizing efficiencies in such networks involve increased reuse of frequency channels and therefore co-channel interference, either from inter-cell or co-scheduled intra-cell users, is becoming a significant limiting factor for achieving higher network capacity.

BRIEF DESCRIPTION OF THE DRAWING

Aspects, features and advantages of embodiments of the present invention will become apparent from the following description of embodiments in reference to the appended drawings in which like numerals denote like elements and in which:

FIG. 2 is a flow diagram showing an exemplary method in an evolved node base station in according to various embodiments;

FIG. 3 is a flow diagram showing an exemplary method in a User Equipment according to various embodiments;

DETAILED DESCRIPTION OF EMBODIMENTS

Illustrative embodiments of the present disclosure include, but are not limited to, methods, systems, and apparatuses for selection of acknowledgement signal timing in a wireless communication network.

Various aspects of the illustrative embodiments will be described using terms commonly employed by those skilled in the art to convey the substance of their work to others skilled in the art. However, it will be apparent to those skilled in the art that some alternate embodiments may be practiced using with portions of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order to not obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure.

This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware instructions and/or programs, a combinational logic circuit, and/or other suitable components that provide the described functionality.

Figure 1:
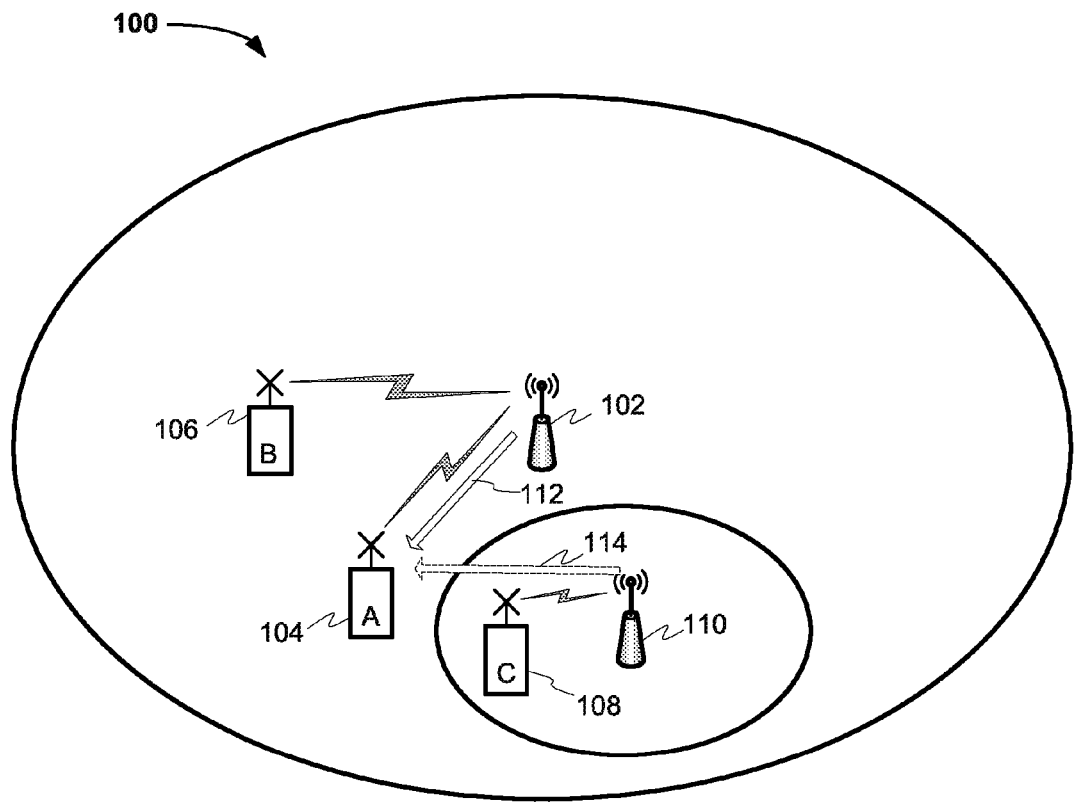
FIG. 1 is block diagram of an example wireless network according to various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) or long-term evolution-advanced (LTE-A) network such as an evolved universal mobile telecommunication system (UMTS) terrestrial radio access network (E-UTRAN).

The network 100 may include a first base station, e.g., evolved node base station (eNB) 102, configured to wirelessly communicate with one or more mobile device(s) or terminal(s), e.g., first user equipment (UE) A 104 and/or second UE B 106. In various embodiments, the eNB 102 may be a fixed station (e.g., a fixed node) or a mobile station/node.

Wireless communication network 100 further includes an evolved node second base station (eNB) 110 covering a cell area that overlaps with that of the first eNB 102, configured to wirelessly communicate with one or more further mobile device(s) or terminal(s), e.g. third user equipment (UE) C 108. Thus, wireless communication network 100 can be considered an example of a heterogeneous network that includes cells of different sizes, each of which may re-use radio resources within the network as appropriate.

In various embodiments, the UE 104-108 and/or the eNB 102, 110 may include a plurality of antennas to implement a multiple-input-multiple-output (MIMO) transmission system, which may operate in a variety of MIMO modes, including single-user MIMO (SU-MIMO), multi-user MIMO (MU-MIMO), close loop MIMO, open loop MIMO or variations of smart antenna processing. The UE 104-108 may provide some type of channel state information (CSI) feedback to the eNB 102,110 via one or more up link channels, and the eNB 102,110 may adjust one or more down link channels based on the received CSI feedback. The feedback accuracy of the CSI may affect the performance of the MIMO system.

In various embodiments, the uplink channels and the downlink channels may be associated with one or more frequency bands, which may or may not be shared by the uplink channels and the downlink channels. The one or more frequency bands may be further divided into one or more subbands, which may or may not be shared by the uplink and downlink channels. Each frequency subband, one or more aggregated subbands, or the one or more frequency bands for the uplink or downlink channels (wideband) may be referred to as a frequency resource.

The base station 102 may be configured to re-use frequency resources for communication to both the first UE 104 and the second UE 106, for example through use of multi-user multiple-in-multiple-out (MU-MIMO) techniques.

While embodiments are described with reference to an LTE network, some embodiments may be used with other types of wireless access networks.

The following inventive embodiments may be used in a variety of applications including transmitters and receivers of a radio system, although the present invention is not limited in this respect. Radio systems specifically included within the scope of the present disclosure include, but are not limited to, network interface cards (NICs), network adaptors, fixed or mobile client devices, relays, base stations, femtocells, gateways, bridges, hubs, routers, access points, or other network devices. Further, the radio systems within the scope of the invention may be implemented in cellular radiotelephone systems, satellite systems, two-way radio systems as well as computing devices including such radio systems including personal computers (PCs), tablets and related peripherals, personal digital assistants (PDAs), personal computing accessories, hand-held communication devices and all systems which may be related in nature and to which the principles of the inventive embodiments could be suitably applied.

To improve the capacity of wireless communication networks, deployment of heterogeneous networks to achieve cell-splitting gains and MU-MIMO have been suggested. However, in both scenarios, co-channel interference, either from inter-cell or co-scheduled intra-cell users, is expected to become the dominant limiting factor for achieving higher network capacity. For example, while MU-MIMO makes use of beam steering to limit the received signal power at the first UE 104 of the signal transmitted to the second UE 106, the signal will still be present at the first UE at some level. If the first and second UE are utilizing the same frequency and time resources then the signal transmitted to the second UE 106 may result in co-channel interference at the first UE 104. Similarly, while the third UE 108 is communicating with second base station 110, if the same resources are used as for communications between the first UE 104 and the first eNB 102, the signal transmitted to the third UE 108 may cause inter-cell interference at the first UE 104.

In conventional systems, such co-channel or inter-cell interference is mitigated by using coordinated multi-point techniques (CoMP), which helps to avoid interference at the transmitting base station (i.e. on the network side). However, interference mitigation at the UE side, by accounting for spatial properties of the interference, can also provide promising gains in spectral efficiency.

According to some embodiments, interference mitigation at the receiver side is enhanced through the use of advanced interference cancelation algorithms based on information provided to the UE relating to the interference structure. For example, receivers may be provided with side knowledge of the interfering signal, such as, but not limited to, the modulation format, the presence and characteristic of interference, its transmission schemes including allocation, its reference symbols, and its modulation and/or coding, which are not available at the UE side in a wireless communication network. Information can be provided to the first UE 104 using message 112 by the first eNB 102.

According to some embodiments, the first UE 104 may receive and decode one or more messages 114 transmitted by the second base station 110 that provide information on an interfering signal being transmitted from the second base station 110 to the third UE 108. The first UE 104 may be provided with configuration data by the first base station 102 to allow the first UE 104 to identify relevant information within the messages 114 being transmitted by the second base station 110.

Detailed embodiments described below provide a number of ways in which the additional information on the structure of the interference can be conveyed to the UE 104 to assist in interference mitigation at the UE.

Referring to FIG. 2 an exemplary method 200 performed at eNB 102 of the wireless network 100 in accordance with some embodiments is shown. First, a communication channel between the first UE 104 and the eNB 102 is established 202, for example using the normal UE registration procedure to attach to the network and request radio resources for communication. Once the eNB 102 has registered the presence of the first UE 104 and allocated frequency resources for communication with the first UE 104, the eNB may identify 204 any other ongoing communications, for example with second UE 106, using the same frequency resources and that may therefore cause interference at the first UE 104. If a potentially interfering signal being transmitted by the eNB 102 is identified, then information on the interfering signal is conveyed 206 to the first UE 104.

The eNB 102 may then further identify 208 signals transmitted by neighbouring eNBs, such as eNB 110, that are using the same frequency resources. Again, if a potentially interfering signal is identified, for example the communications between the second eNB 110 and the third UE 108, then information on the interfering signal is conveyed 210 to the first UE 104.

According to some embodiments, the eNB 102 may only identify interfering signals transmitted by itself (i.e. blocks 204/206) or alternatively only interfering signals transmitted by neighbouring eNBs (blocks 208/210). Information relating to interfering signals, or interfering signal characteristics information, may be provided as a separate message from the eNB 102 to the first UE 104 for each identified signal, or may be combined into a single communication for all identified interference sources. In some embodiments, the information relating to interfering signals may be provided as part of downlink control information (DCI) provided to the first UE 104.

According to some embodiments, the interfering signal information provided by the first eNB 102 to the first UE 104 may be in the form of parameters that identify control information being transmitted by the base station 102, or by a neighbouring eNB 110 that contains parameters relating to the interfering signal and that should be monitored and decoded by the first UE 104. For example, the base station 102 could provide information to enable the user equipment 104 to receive and decode downlink channel information (DCI) relating to other user equipment in the network.

FIG. 3 shows an exemplary method 300 performed at the first UE 104 in the wireless network 100. The first UE 104 requests allocation 302 of frequency resources from the eNB 102, and receives information on allocated resources. The first UE 104 also receives 304 interfering signal characteristics information from the first eNB 102, relating to other signals transmitted by the eNB 102 and/or neighbouring eNBs. The received interfering signal characteristics information may comprise, for example, the modulation format, the presence and characteristic of interference, its transmission schemes including allocation, its reference symbols, and its modulation and/or coding, of potentially interfering signals.

The first UE 104 then receives 306 a downlink channel, for example the Physical Downlink Shared Channel (PDSCH) from the eNB 102 using the provided interfering signal characteristics information to mitigate interference.

According to one embodiment signaling of interference information may be explicitly included by the eNB 102 in downlink control information (DCI) sent to the UE. For example, for DCI Format 2C, which is used to schedule Physical Downlink Shared Channel (PDSCH) in Transmission Mode 9 (TM9), the following information is transmitted, as defined in 3GPP TS 36.211: "Evolved Universal Terrestrial Radio Access (E-UTRA); Physical channels and modulation":

The following information is transmitted by means of the DCI format 2C:
  Carrier indicator—0 or 3 bits. The field is present according to the definitions in 3GPP TS 36.213: "Evolved Universal Terrestrial Radio Access (E-UTRA); Multiplexing and channel coding".
  Resource allocation header (resource allocation type 0/type 1)–1 bit as defined in section 7.1.6 of 3GPP TS 36.213
    If downlink bandwidth is less than or equal to 10 PRBs, there is no resource allocation header and resource allocation type 0 is assumed.
  Resource block assignment:
    For resource allocation type 0 as defined in section 7.1.6.1 of 3GPP TS 36.213
    $\lceil N_{RB}^{DL}/P \rceil$ bits provide the resource allocation
    For resource allocation type 1 as defined in section 7.1.6.2 of 3GPP TS 36.213
    $\lceil \log_2(P) \rceil$ bits of this field are used as a header specific to this resource allocation type to indicate the selected resource blocks subset
    1 bit indicates a shift of the resource allocation span
    $(\lceil N_{RB}^{DL}/P \rceil - \lceil \log_2(P) \rceil - 1)$ bits provide the resource allocation
  where the value of P depends on the number of DL resource blocks as indicated in section[7.1.6.1] of [3]
  TPC command for PUCCH-2 bits as defined in section 5.1.2.1 of 3GPP TS 36.213
  Downlink Assignment Index (this field is present in TDD for all the uplink-downlink configurations and only applies to TDD operation with uplink-downlink configuration 1-6. This field is not present in FDD)—2 bits
  HARQ process number—3 bits (FDD), 4 bits (TDD)
  Antenna port(s), scrambling identity and number of layers—3 bits as specified in Table 5.3.3.1.5C-1 where $n_{SCID}$ is the scrambling identity for antenna ports 7 and 8 defined in section 6.10.3.1 of 3GPP TS 36.212: "Evolved Universal Terrestrial Radio Access (E-UTRA); Physical channels and modulation".
  SRS request—[0-1] bit. This field can only be present for TDD and if present is defined in section 8.2 of 3GPP TS 36.213
    In addition, for transport block 1:
  Modulation and coding scheme—5 bits as defined in section 7.1.7 of 3GPP TS 36.213
  New data indicator—1 bit
  Redundancy version—2 bits
    In addition, for transport block 2:
  Modulation and coding scheme—5 bits as defined in section 7.1.7 of 3GPP TS 36.213
  New data indicator—1 bit
  Redundancy version—2 bits In order to include additional information about one or more interfering signals, the DCI Format may be extended or a new DCI format can be defined. For example, in the case of one interfering signal, DCI Format 2C can include additional fields as described below: To describe the presence of interference on some physical resource blocks (PRBs) a new 'interference resource block assignment' field can be provided to the UE in the DCI. In this case the UE can assume the presence of an interfering PDSCH on PRBs indicated by 'interference resource blocks assignment' and no interference on the remaining PRBs of the UEs allocation indicated by 'resource block assignment' field:
  Interference resource block assignment:
    For resource allocation type 0 as defined in section 7.1.6.1 of 3GPP TS 36.213
    $\lceil N_{RB}^{DL}/P \rceil$ bits provide the resource allocation
    For resource allocation type 1 as defined in section 7.1.6.2 of 3GPP TS 36.213
    $\lceil \log_2(P) \rceil$ bits of this field are used as a header specific to this resource allocation type to indicate the selected resource blocks subset
    1 bit indicates a shift of the resource allocation span
    $(\lceil N_{RB}^{DL}/P \rceil - \lceil \log_2(P) \rceil - 1)$ bits provide the resource allocation
  The signalling 'interference resource block assignment' can also be used to indicate applicability of other parameters describing interfering PDSCH signals to an identified set of PRBs.

To facilitate channel estimation on the indicated resource block assignment (or over the entire resource block assignment of the UE when the 'interference resource block assignment' is not provided), the DeModulation Reference Signal (DM-RS) parameters of an interfering signal can be provided to the UE using the following field.
  Antenna port(s), scrambling identity and number of layers—3 bits as specified in Table 5.3.3.1.5C-1 where $n_{SCID}$ is the scrambling identity for antenna ports 7 and 8 defined in section 6.10.3.1 of 3GPP TS 36.212

To facilitate usage of more advanced receivers that exploit the structure of an interfering signal (e.g. the modulation of the interfering signal for a maximum likelihood MIMO receiver or a successive interference cancellation receiver) information about the modulation and coding scheme can be provided to the UE using the following field:

Modulation and coding scheme—5 bits as defined in section 7.1.7 of 3GPP TS 36.213

Potentially the 'Modulation and coding scheme' parameter can be replaced by a 2 bit parameter indicating modulation order only. For example:

00-BPSK (or 4-ASK), 01-QPSK, 10-16QAM, 11-64QAM

To facilitate use of a more advanced interference canceling receiver that may perform joint decoding of useful and interfering PDSCH, the Radio Network Temporary Identifier (RNTI) or RNTI index (among other configured RNTIs), and/or physical cell ID or index of physical cell IDs (among other configured cell IDs) may be included the DCI. The RNTI and physical cell Id values signalled in the DCI can then be used to descramble the interfering PDSCH before joint decoding in accordance to 3GPP TS 36.211, i.e.:

For each codeword q, the block of bits $b^{(q)}(0), \ldots, b^{(q)}(M_{bit}^{(q)}-1)$, where $M_{bit}^{(q)}$ is the number of bits in codeword q transmitted on the physical channel in one subframe, shall be scrambled prior to modulation, resulting in a block of scrambled bits $\tilde{b}^{(q)}(0), \ldots, \tilde{b}^{(q)}(M_{bit}^{(q)}-1)$ according to $$\tilde{b}^{(q)}(i) = (b^{(q)}(i) + c(q)(i)) \bmod 2$$

where the scrambling sequence $c^{(q)}(i)$ is given by Section 7.2. The scrambling sequence generator shall be initialised at the start of each subframe, where the initialisation value of $c_{init}$ depends on the transport channel type according to $$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$$

where $n_{RNTI}$ corresponds to the RNTI associated with the PDSCH transmission as described in Section 7.1[4].

Up to two codewords can be transmitted in one subframe, i.e., $q \in \{0,1\}$. In the case of single codeword transmission, q is equal to zero.

In the case of two or more interfering signals the multiple versions of the proposed fields above can be sent to the UE as a part of extended or new DCI. While the above embodiments have been described in reference to the particular case of Format 2C of DCI information, it will be apparent to the skilled person that the described extra fields could be incorporated into other formats described in the referenced standard documents. According to some embodiments, signaling of interference information may be performed implicitly by configuring the UE, via higher layers, with one or more other users' RNTIs whose ePDCCH/PDCCH search space the UE may monitor in addition to its own ePDCCH/PDCCH search space determined by UE's own RNTI. The scrambling of ePDCCH/PDCCH DCI's CRC and scrambling of the interfering PDSCH in this case is performed in accordance to the other users' RNTIs. In addition to other user RNTIs, a physical cell ID defining scrambling of the DCI may be provided to the UE to enable neighboring cell's DCIs to be decoded by the UE. If the DM-RS sequence, DCI scrambling, bandwidth, search space, etc associated with other UE's ePDCCH/PDCCH to be monitored by the UE is the same as its own corresponding parameters, the UE may not need to perform blind decoding but may simply check the CRC using the C-RNTI of the other UE.

According to some embodiments, the UE may not need to perform multiple blind decodings to obtain the modulation and coding scheme (MCS) for another UE if the following conditions are fulfilled.

A UE 104 may overhear PDCCH/ePDCCH for another UE 106 or 108 to obtain its modulation order (i.e. MCS). If the following conditions are fulfilled, the UE may not need to perform additional blind decoding but will need to check the masked RNTI on the CRC to obtain the information:

The two UEs have the same search space (i.e. same hashing function).

The two UEs have the same size of DCI contents (e.g. same system bandwidth and transmission mode).

The two UEs are served by cells with the same physical cell ID or configured with the same virtual cell ID.

To facilitate 1) and/or 3), the RNTI (this RNTI may be different from the C-RNTI) for defining a search space and/or physical/virtual cell ID for DM-RS and DCI scrambling may be configured by radio resource control (RRC) signaling. By doing this, two PDCCH/ePDCCHs may be detected without increasing the number of blind decoding attempts but by checking two masked C-RNTIs (i.e. for UE 104 and for UE 106, 108). If the configured RNTI is applied also for the CRC mask, a one-time CRC check can also be performed.

As another example, if the DCI sizes are same for the two UEs (e.g. due to the same system bandwidth and/or transmission modes), the search spaces for the two UEs may be shared. To support this, the following operation may be performed:

C-RNTI-X may be configured to a UE having C-RNTI-Y to monitor other UE's PDCCH/ePDCCH.

Whether or not the UE can check CRC for other UE with C-RNTI-X may be configured by RRC signaling.

The UE with C-RNTI-Y may assume the same search space, same DM RS sequence (if any), same scrambling sequence for DCI, etc. when performing a single blind decoding with simple check of the CRC for the other UE's C-RNTI-X.

The related parameters to enable a single blind decoding attempt may be provided by RRC signaling.

According to some embodiments interference information may be signaled in additional DCI messages sent to the UE in its own ePDCCH/PDCCH search space, as defined by the RNTI of the UE. Since DCIs containing information about useful PDSCH and an interfering PDSCH are transmitted in the same ePDCCH/PDCCH search space, a special IA-RNTI (Interference Assistance) configured via a higher layer to the UE should be used by the UE to descramble the DCI's CRC describing the interfering PDSCH structure. The serving cell physical cell ID can be used by the UE for descrambling of DCI.

According to some embodiments interference information may be signaled in DCIs sent to the UE in a special ePDCCH/PDCCH search space defined by an IA-RNTIs (Interference Assistance RNTI). In this case the search space may be shared by multiple UEs. To distinguish DCIs sent to different UEs, the scrambling of the ePDCCH/PDCCH DCI's CRC is performed by set of RNTIs configured to the UE via higher layer signaling. UE may also assume that RNTI used for ePDCCH/PDCCH CRC scrambling is also applied to a corresponding PDSCH. In addition to the RNTI used to descramble the DCI's CRC, a physical cell ID defining scrambling of DCI may be provided to the UE to enable neighboring cells' DCI decoding by the UE.

According to some embodiments outlined above, the search space in the PDCCH is determined in accordance to 3GPP TS 36.213 as follows:

The control region of each serving cell consists of a set of CCEs, numbered from 0 to $N_{CCE,k}-1$ according to Section 6.8.1 in 3GPP TS 36.213, where $N_{CCE,k}$ is the total number of CCEs in the control region of subframe k. The UE shall monitor a set of PDCCH candidates on one or more activated serving cells as configured by higher layer signalling for control information in every non-DRX subframe, where monitoring implies attempting to decode each of the PDCCHs in the set according to all the monitored DCI formats.

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L\{Y_k+m')\mod \lfloor N_{CCE,k}/L \rfloor\}+i$$

where $Y_k$ is defined below, i=0, ..., L-1.

For the UE-specific search space $S_k^{(L)}$ at aggregation level L, the variable $Y_k$ is defined by $$Y_k = (A \cdot Y_{k-1}) \mod D$$

where $Y_{-1} = n_{RNTI} \neq 0$, A=39827, D=65537 and $k = \lfloor n_s/2 \rfloor$, $n_s$ is the slot number within a radio frame. The RNTI value used for $n_{RNTI}$ is defined as described in the embodiments above.

According to some embodiments outlined above, the scrambling of ePDCCH/PDCCH DCI's CRC is determined as follows 3GPP TS 36.212:

In the case where UE transmit antenna selection is not configured or applicable, after attachment, the CRC parity bits are scrambled with the corresponding RNTI $x_{rnti,0}, x_{rnti,1}, \ldots, x_{rnti,15}$, where $x_{rnti,0}$ corresponds to the MSB of the RNTI, to form the sequence of bits $c_0, c_1, c_2, c_3, \ldots, c_{B-1}$. The relation between $c_k$ and $b_k$ is:

$$c_k = b_k$$

for k=0, 1, 2, ..., A-1

$$c_k = (b_k + x_{rnti,k-A}) \mod 2$$

for k=A, A+1, A+2, ..., A+15.

In the case where UE transmit antenna selection is configured and applicable, after attachment, the CRC parity bits of PDCCH with DCI format 0 are scrambled with the antenna selection mask $x_{AS,0}, x_{AS,1}, \ldots, x_{AS,15}$ as indicated in Table 5.3.3.2-1 and the corresponding RNTI $x_{rnti,0}, x_{rnti,1}, \ldots, x_{rnti,15}$ to form the sequence of bits $c_0, c_1, c_2, c_3, \ldots, c_{B-1}$. The relation between $c_k$ and $b_k$ is:

$$c_k = b_k$$

for k=0, 1, 2, ..., A-1

$$c_k = (b_k + x_{rnti,k-A} + x_{AS,k-A}) \mod 2$$

for k=A, A+1, A+2, ..., A+15.

TABLE 5.3.3.2-1

UE transmit antenna selection mask.

| UE transmit antenna selection | Antenna selection mask $<x_{AS,0}, x_{AS,1}, \ldots, x_{AS,15}>$ |
|---|---|
| UE port 0 | <0, 0, 0, 0, 0, 0, 0, 0, 0, 0, 0, 0, 0, 0, 0, 0> |
| UE port 1 | <0, 0, 0, 0, 0, 0, 0, 0, 0, 0, 0, 0, 0, 0, 0, 1> |

Figure 4:
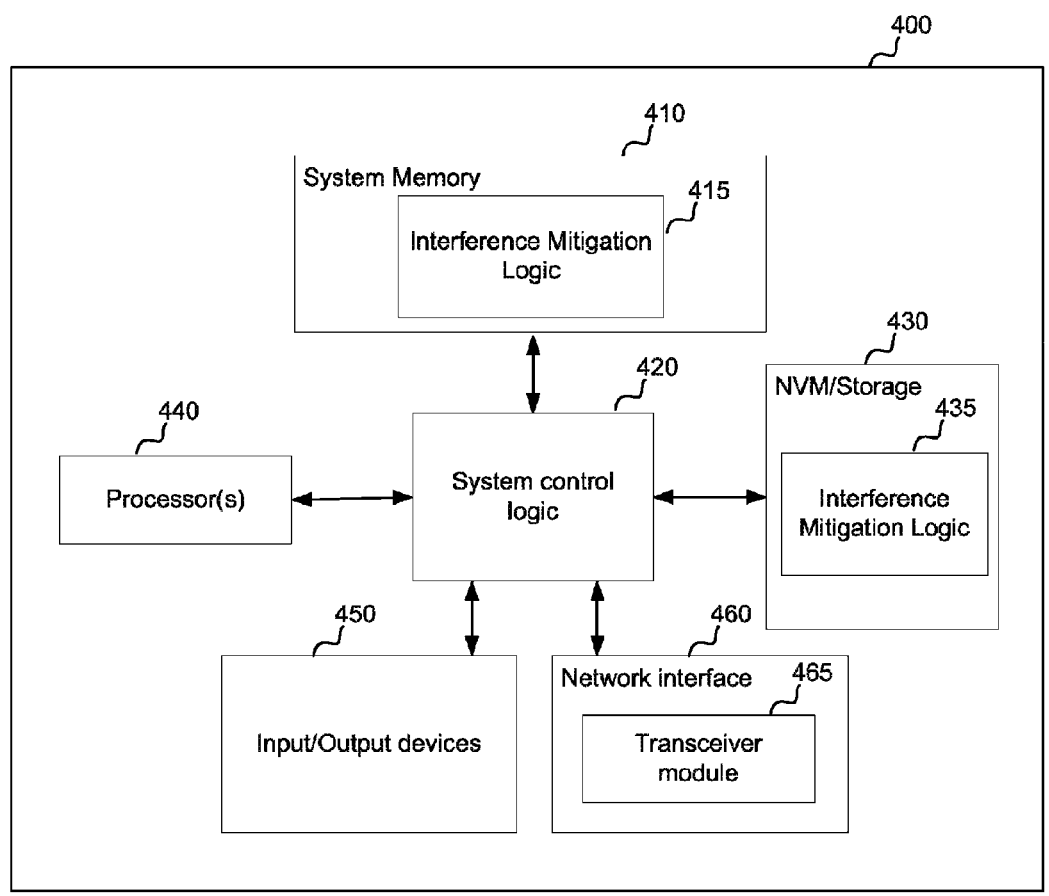
FIG. 4 is a block diagram showing an example system in accordance with various embodiments.

The eNBs 102, 110 and UEs (104, 106, 108) described herein may be implemented into a system using any suitable hardware and/or software to configure as desired. FIG. 4 illustrates, for one embodiment, an example system 400 comprising one or more processor(s) 440, system control logic 420 coupled with at least one of the processor(s) 440, system memory 410 coupled with system control logic 420, non-volatile memory (NVM)/storage 430 coupled with system control logic 420, and a network interface 460 coupled with system control logic 420. The system control logic 420 may also be coupled to Input/Output devices 450.

Processor(s) 440 may include one or more single-core or multi-core processors. Processor(s) 440 may include any combination of general-purpose processors and dedicated processors (e.g., graphics processors, application processors, baseband processors, etc.). Processors 440 may be operable to carry out the above described methods, using suitable instructions or programs (i.e. operate via use of processor, or other logic, instructions). The instructions may be stored in system memory 410, as interference mitigation logic memory portion 415, or additionally or alternatively may be stored in (NVM)/storage 430, as NVM interference mitigation logic instruction portion 435. Processors(s) 440 may be configured to execute the embodiments of FIGS. 2-3 in accordance with various embodiments. In an embodiment in which the system 400 implements eNB 102, processor(s) 440 may be configured to transmit to the UE 102 interfering signal characteristics information 112.

System control logic 420 for one embodiment may include any suitable interface controllers to provide for any suitable interface to at least one of the processor(s) 440 and/or to any suitable device or component in communication with system control logic 420.

System control logic 420 for one embodiment may include one or more memory controller(s) (not shown) to provide an interface to system memory 410. System memory 410 may be used to load and store data and/or instructions, for example, for system 400. System memory 410 for one embodiment may include any suitable volatile memory, such as suitable dynamic random access memory (DRAM), for example.

NVM/storage 430 may include one or more tangible, non-transitory computer-readable media used to store data and/or instructions, for example. NVM/storage 430 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 430 may include a storage resource physically part of a device on which the system 400 is installed or it may be accessible by, but not necessarily a part of, the device. For example, the NVM/storage 430 may be accessed over a network via the network interface 460.

System memory 410 and NVM/storage 430 may respectively include, in particular, temporal and persistent copies of, for example, the instructions memory portions holding the interference mitigation logic 415 and 435, respectively. Interference mitigation logic instructions portions 415 and 435 may include instructions that when executed by at least one of the processor(s) 440 result in the system 400 implementing a one or both of methods 200 and/or 300, or the method(s) of any other embodiment, as described herein. In some embodiments, instruction portions 415 and 435, or hardware, firmware, and/or software components thereof, may additionally/alternatively be located in the system control logic 420, the network interface 460, and/or the processor(s) 440.

Network interface 460 may have a transceiver module 465 to provide a radio interface for system 400 to communicate over one or more network(s) (e.g. wireless communication network) and/or with any other suitable device. In various embodiments, the transceiver 465 may be integrated with other components of system 400. For example, the transceiver 465 may include a processor of the processor(s) 440, memory of the system memory 410, and NVM/Storage of NVM/Storage 430. Network interface 460 may include any suitable hardware and/or firmware. Network interface 460 may be operatively coupled to a plurality of antennas to provide a multiple input, multiple output radio interface. Network interface 460 for one embodiment may include, for example, a network adapter, a wireless network adapter, a telephone modem, and/or a wireless modem.

For one embodiment, at least one of the processor(s) 440 may be packaged together with logic for one or more controller(s) of system control logic 420. For one embodiment, at least one of the processor(s) 440 may be packaged together with logic for one or more controllers of system control logic 420 to form a System in Package (SiP). For one embodiment, at least one of the processor(s) 440 may be integrated on the same die with logic for one or more controller(s) of system control logic 420. For one embodiment, at least one of the processor(s) 440 may be integrated on the same die with logic for one or more controller(s) of system control logic 420 to form a System on Chip (SoC).

Figure 5:
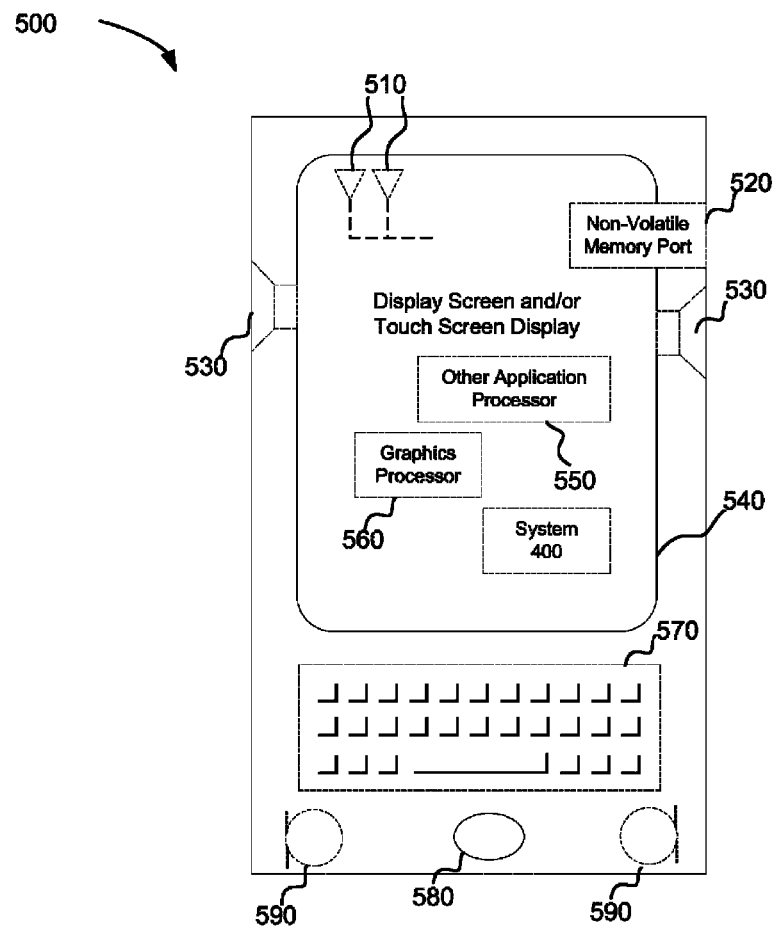
FIG. 5 is a block diagram showing an example wireless apparatus configured for communicating in a wireless network according to one or more of the inventive methods disclosed herein.

In various embodiments, the I/O devices 450 may include user interfaces designed to enable user interaction with the system 400, peripheral component interfaces designed to enable peripheral component interaction with the system 400, and/or sensors designed to determine environmental conditions and/or location information related to the system 400. FIG. 5 shows an embodiment in which the system 400 implements a UE 104, 106, 108 in the specific form of a mobile device 500.

In various embodiments, user interfaces could include, but are not limited to, a display 540 (e.g., a liquid crystal display, a touch screen display, etc.), a speaker 530, a microphone 590, one or more cameras 580 (e.g., a still camera and/or a video camera), a flashlight (e.g., a light emitting diode flash), and a keyboard 570.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 460 to communicate with components of a positioning network, e.g., a global positioning system (GPS) satellite.

In various embodiments, the system 400 may be a mobile computing device such as, but not limited to, a laptop computing device, a tablet computing device, a netbook, a mobile phone, etc. In various embodiments, system 400 may have more or less components, and/or different architectures.

In embodiments, the implemented wireless network may be a 3rd Generation Partnership Project's long term evolution (LTE) advanced wireless communication standard, which may include, but is not limited to releases 8, 9, 10, 11 and 12, or later, of the 3GPP's LTE-A standards.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

In various embodiments, an apparatus for use in a wireless communication system, the apparatus comprising a communication module configured to receive interfering signal characteristics information, and receive a downlink signal in the presence of an interfering signal, and an interference mitigation module coupled to the communication module and configured to suppress interference in the received downlink signal caused by the interfering signal based on the interfering signal characteristics information.

In various embodiments, the interfering signal characteristics information comprises at least one of: a modulation format, a presence and characteristics of interference, a transmission scheme, one or more reference symbols of the interfering signal, and a modulation or coding scheme of the interfering signal.

In various embodiments, the communication module is further configured to receive the interfering signal characteristics information from an eNodeB transmitting the downlink signal.

In various embodiments, wherein the interfering signal characteristics information comprises an interference resource block assignment contained within a Downlink Control Information (DCI) message associated with the user equipment.

In various embodiments, the interference resource block assignment indicates one or more physical resource blocks (PRBs) associated with the interfering signal.

In various embodiments, wherein the interfering signal characteristics information comprise demodulation reference signal (DM-RS) parameters associated with the interfering signal.

In various embodiments, the apparatus further comprises a decoding module configured to jointly decode the downlink signal and the interfering signal based on the interfering signal characteristics information.

In various embodiments, the interfering signal characteristics information comprises DCI associated with the interfering signal.

In various embodiments, wherein the communication module is further configured to receive interfering signal characteristics information by receiving a Radio Network Temporary Identifier (RNTI) corresponding to an apparatus of an interfering cell and monitoring a control channel search space for the DCI based on the received RNTI.

In various embodiments, the RNTI is associated with a second apparatus, the second apparatus associated with the interfering signal.

In various embodiments, the communication module is further configured to receive a cell ID associated with a neighbouring cell and to monitor a control channel associated with the neighbouring cell.

In various embodiments, the apparatus and the second apparatus are associated with the same control channel search space and are associated with a common cell ID; and wherein the size of the DCI contents received by each apparatus are the same.

In various embodiments, the RNTI comprises an Interference-Assistance RNTI (IA-RNTI) associated with a control channel search space dedicated to interference information.

In various embodiments, the downlink signal comprises a Physical Downlink Shared Channel (PDSCH) associated with the apparatus and the interfering signal comprises a second PDSCH associated with a second apparatus.

In various embodiments, an apparatus is provided for use in a wireless communication system, the apparatus comprising means for receiving interfering signal characteristics information, means for receiving a downlink signal in the presence of an interfering signal, and means for suppressing interference in the received downlink signal caused by the interfering signal based on the interfering signal characteristics information.

In various embodiments, the apparatus may comprise a system on a chip, a chipset, and/or a user equipment. According to various embodiments, the user equipment may further comprise one or more of: a screen, a speaker, a touchscreen, a keyboard, an antenna array including a plurality of antennas, a graphics processor, or an application processor. One the skilled in the art understands that a "processing circuitry configured to" perform a function comprises at least one of "hardware configured to", "software configured to" and a "combination of hardware and software configured to" perform that function.

In various embodiments, a method of mitigating interference at a user equipment in a wireless communication system, the method comprising receiving, at the user equipment, a physical downlink shared channel (PDSCH) in the presence of an interfering signal, obtaining, at the user equipment, information defining characteristics of the interfering signal, and suppressing interference caused by the interfering signal when receiving the (PDSCH) based on the information defining characteristics of the interfering signal.

In various embodiments, the information defining characteristics of the interfering signal comprises at least one of: a modulation format, a presence and characteristics of interference, a transmission scheme, one or more reference symbols of the interfering signal, and a modulation or coding scheme of the interfering signal.

In various embodiments, wherein obtaining information defining characteristics of the interfering signal comprises receiving interfering signal characteristics information transmitted by an evolved nodeB (eNodeB).

In various embodiments, obtaining information defining characteristics of the interfering signal further comprises receiving Downlink Control Information (DCI) associated with the user equipment and comprising an interference resource block assignment. In various embodiments, receiving the PDSCH further comprises performing joint decoding of the downlink signal and interfering signal based on the interfering signal characteristics information.

In various embodiments, obtaining information defining characteristics of the interfering signal comprises receiving, at the user equipment, Downlink Control Information (DCI) associated with the interfering signal.

In various embodiments, wherein receiving the DCI associated with the interfering signal comprises receiving a Radio Network Temporary Identifier (RNTI) corresponding to user equipment of interfering cells and monitoring a control channel search space for the DCI based on the received RNTI.

In various embodiments, receiving DCI information associated with the interfering signal further comprises receiving a cell ID associated with a neighbouring cell and monitoring a control channel associated with the neighbouring cell.

In various embodiments, a non-transitory computer readable medium is provided comprising computer program instructions that, when executed on processor, cause a user equipment to receive, at the user equipment, interfering signal characteristics information, receive, at the user equipment, a downlink signal in the presence of an interfering signal, and suppress interference in the received downlink signal caused by the interfering signal based on the interfering signal characteristics information.

In various embodiments, an circuit for use in an eNodeB in a wireless communication system is provided, the circuit comprising a communication module configured to transmit a first downlink signal to a first user equipment an interference management module coupled to the communication module and configured to identify downlink signals in the wireless communication system that are expected to interfere with the first downlink signal transmitted to the first user equipment and wherein the communication module is further configured to transmit to the first user equipment interfering signal characteristics information relating to any downlink signals that are identified by the interference management module to be expected to interfere with the downlink signal to the first user equipment.

According to various embodiments there is provided a method of providing interference mitigation information to a UE in a wireless communication system, the method comprising transmitting a first downlink signal to a first user equipment identifying other signals in the wireless communication system that are expected to interfere with the first downlink signal transmitted to the first user equipment, and transmitting to the first user equipment interfering signal characteristics information relating to any signals that are identified to be expected to interfere with the first downlink signal.

According to various embodiments, there is provided a non-transient computer readable medium comprising computer program instructions that when executed on a processor cause the method of any above described embodiments to be performed.

The invention claimed is:

1. A method of mitigating interference at a user equipment in a wireless communication system, the method comprising:
   receiving, at the user equipment, a physical downlink shared channel (PDSCH) in the presence of an interfering signal;
   receiving, at the user equipment from a serving eNodeB, Downlink Control Information (DCI) to provide information defining characteristics of the interfering signal; and
   suppressing interference caused to the PDSCH by the interfering signal based on the information defining characteristics of the interfering signal.

2. The method of claim 1, wherein information defining characteristics of the interfering signal comprises a modulation format, a presence and characteristics of interference, a transmission scheme, one or more reference symbols of the interfering signal, or a modulation or coding scheme of the interfering signal.

3. The method of claim 1, wherein the DCI comprises an interference resource block assignment.

4. The method of claim 1, wherein the DCI is DCI format 2C.

5. An apparatus for use in a wireless communication system, the apparatus comprising:
   communication circuitry to:
      receive, from a serving eNodeB in Downlink Control Information (DCI), interfering signal characteristics information; and
      receive a physical downlink shared channel (PDSCH) in the presence of an interfering signal; and
   interference mitigation circuitry coupled to the communication circuitry, the interference mitigation circuitry to suppress interference caused to the PDSCH by the interfering signal based on the interfering signal characteristics information.

6. The apparatus of claim 5, wherein the interfering signal characteristics information comprises a modulation format, a presence and characteristics of interference, a transmission scheme, one or more reference symbols of the interfering signal, or a modulation or coding scheme of the interfering signal.

7. The apparatus of claim 5, wherein the DCI includes an interference resource block assignment.

8. The apparatus of claim 7, wherein the interference resource block assignment indicates one or more physical resource blocks (PRBs) associated with the interfering signal.

9. The apparatus of claim 5, wherein the interfering signal characteristics information comprises demodulation reference signal (DM-RS) parameters associated with the interfering signal.

10. The apparatus of claim 5, further comprising decoding circuitry to jointly decode the PDSCH and the interfering signal based on the interfering signal characteristics information.

11. The apparatus of claim 5, wherein the DCI is DCI format 2C.

12. The apparatus of claim 11, wherein the communication circuitry is to receive interfering signal characteristics information by receiving a Radio Network Temporary Identifier (RNTI) and monitoring a control channel search space for the DCI based on the received RNTI.

13. The apparatus of claim 12, wherein the RNTI is associated with a second apparatus, the second apparatus associated with the interfering signal.

14. The apparatus of claim 11, wherein the communication circuitry is to receive a cell ID associated with a neighbouring cell and to monitor a control channel associated with the neighbouring cell.

15. The apparatus of claim 11, wherein a user equipment and a second user equipment are associated with a same control channel search space and are associated with a common cell ID; and wherein a size of DCI contents received by each apparatus are the same.

16. The apparatus of claim 12, wherein the RNTI comprises an Interference-Assistance RNTI (IA-RNTI) associated with a control channel search space dedicated to interference information.

17. The apparatus of claim 5, wherein the PDSCH is a first PDSCH and the interfering signal comprises a second PDSCH associated with a second apparatus.

18. A circuit for use in an eNodeB in a wireless communication system, the circuit comprising:
   communication circuitry to transmit a first physical downlink shared channel (PDSCH) to a first user equipment;
   interference management circuitry coupled to the communication circuitry, the interference management circuitry to identify downlink signals in the wireless communication system that are expected to interfere with the PDSCH transmitted to the first user equipment; and
   wherein the communication circuitry is further to transmit to the first user equipment Downlink Control Information (DCI) including interfering signal characteristics information relating to any downlink signals that are identified by the interference management circuitry to be expected to interfere with the PDSCH to the first user equipment.

19. The circuit of claim 18, wherein the interfering signal characteristics information comprises a modulation format, a presence and characteristics of interference, a transmission scheme, one or more reference symbols of the interfering signal, or a modulation or coding scheme of the interfering signal.

20. One or more non-transient computer readable media comprising computer program instructions that when executed implement a method comprising:
   receiving, at a user equipment, a physical downlink shared channel (PDSCH) in the presence of an interfering signal;
   receiving, at the user equipment from a serving eNodeB, Downlink Control Information (DCI) to provide information defining characteristics of the interfering signal; and
   suppressing interference caused to the PDSCH by the interfering signal based on the information defining characteristics of the interfering signal.

21. The one or more non-transient computer readable media of claim 20, wherein information defining characteristics of the interfering signal comprises a modulation format, a presence and characteristics of interference, a transmission scheme, one or more reference symbols of the interfering signal, or a modulation or coding scheme of the interfering signal.

22. The one or more non-transient computer readable media of claim 20, wherein the DCI comprises an interference resource block assignment.

23. The one or more non-transient computer readable media of claim 20, wherein the DCI is DCI format 2C.

* * * * *